United States Patent [19]

Chai

[11] Patent Number: 5,341,686
[45] Date of Patent: Aug. 30, 1994

[54] VERTICALLY DISPOSED WATER METER

[76] Inventor: Wen L. Chai, No. 1, Wen Chang Road, Yu Min Ts'un, Erh Shui Hsiang, Changhua Hsien, Taiwan

[21] Appl. No.: 120,364

[22] Filed: Sep. 14, 1993

[51] Int. Cl.⁵ ............................................. G01F 1/06
[52] U.S. Cl. ............................ 73/861.33; 73/861.79
[58] Field of Search ......................... 73/861.33, 861.79

[56] References Cited

U.S. PATENT DOCUMENTS

| | | | |
|---|---|---|---|
| 4,131,017 | 12/1978 | Back | 73/861.79 |
| 4,292,853 | 10/1981 | Williams | 73/861.79 |
| 4,561,312 | 12/1985 | Roy | 73/861.33 X |
| 4,570,497 | 2/1986 | Han | 73/861.79 |

*Primary Examiner*—Herbert Goldstein
*Attorney, Agent, or Firm*—Browdy and Neimark

[57] ABSTRACT

An improved water meter has a meter body with an extended bottom on the periphery of which are disposed a plurality of spaced first oval holes and at the center of the meter is disposed a small round hole. To the bottom of the water meter is journalled a cone-shaped block. A round cavity is disposed at the center of the block with a plurality of spaced first oval holes defined on the periphery thereof that communicate respectively with a plurality of tilted slots on the bottom periphery of the block. A vertical mounting post is disposed at the center of the cavity. A rotation propeller having a plurality of blades and a driving shaft is engaged with the small round hole with its driving shaft and engaged with the vertical mounting shaft at the bottom end. The cone-shaped block and the water meter are journalled together with the rotation propeller housed therebetween. The assembled water meter is received in a housing cavity having a vertical water inlet duct and an elbow water outlet duct connected to a check valve.

1 Claim, 3 Drawing Sheets

VERTICALLY DISPOSED WATER METER

BACKGROUND OF THE INVENTION

The present invention relates to a vertical water meter which is particularly disposed a distance above the ground. The meter body has an extended bottom with a plurality of spaced first oval holes disposed on the periphery thereof. A cone-shaped block journalled to the meter is provided with a round cavity at the center thereof having a plurality of spaced second oval holes on the periphery of the cavity which are in communication with a plurality of slots defined at the bottom end of the cone-shaped block. A rotation propeller having a driving shaft and a plurality of blades is mounted to a mounting post disposed at the center of the round cavity of the block with the driving shaft engaged with a small round hole at one end. The assembled water meter is received in a housing cavity having a vertical water inlet duct and a horizontal water outlet that are connected to an elbow duct and a straight duct respectively.

Referring to FIG. 1, the conventional water meter has a meter body 10A and a blade driven propeller 20A having a driving shaft 21A, a propeller receiving chamber 30A into which water can be led, causing the propeller 20A to spin; and a meter housing cavity 40A having a water inlet 41A and a water outlet 42A and a support 43A.

The conventional water meter is so structured and can only be disposed against the ground. Such arrangement of the water meter makes the check and reading of the same relatively difficult and the meter easily gets dirty.

SUMMARY OF THE INVENTION

The primary object of the present invention is to provide an improved water meter which is simple to mount and easy to maintain.

Another object of the present invention is to provide an improved water meter which has a vertical structure so that the meter can be disposed high above the ground and mounted without digging a hole and is easy for reading.

DETAILED DESCRIPTION OF THE PREFERRED EMBODIMENT

Figure 1:
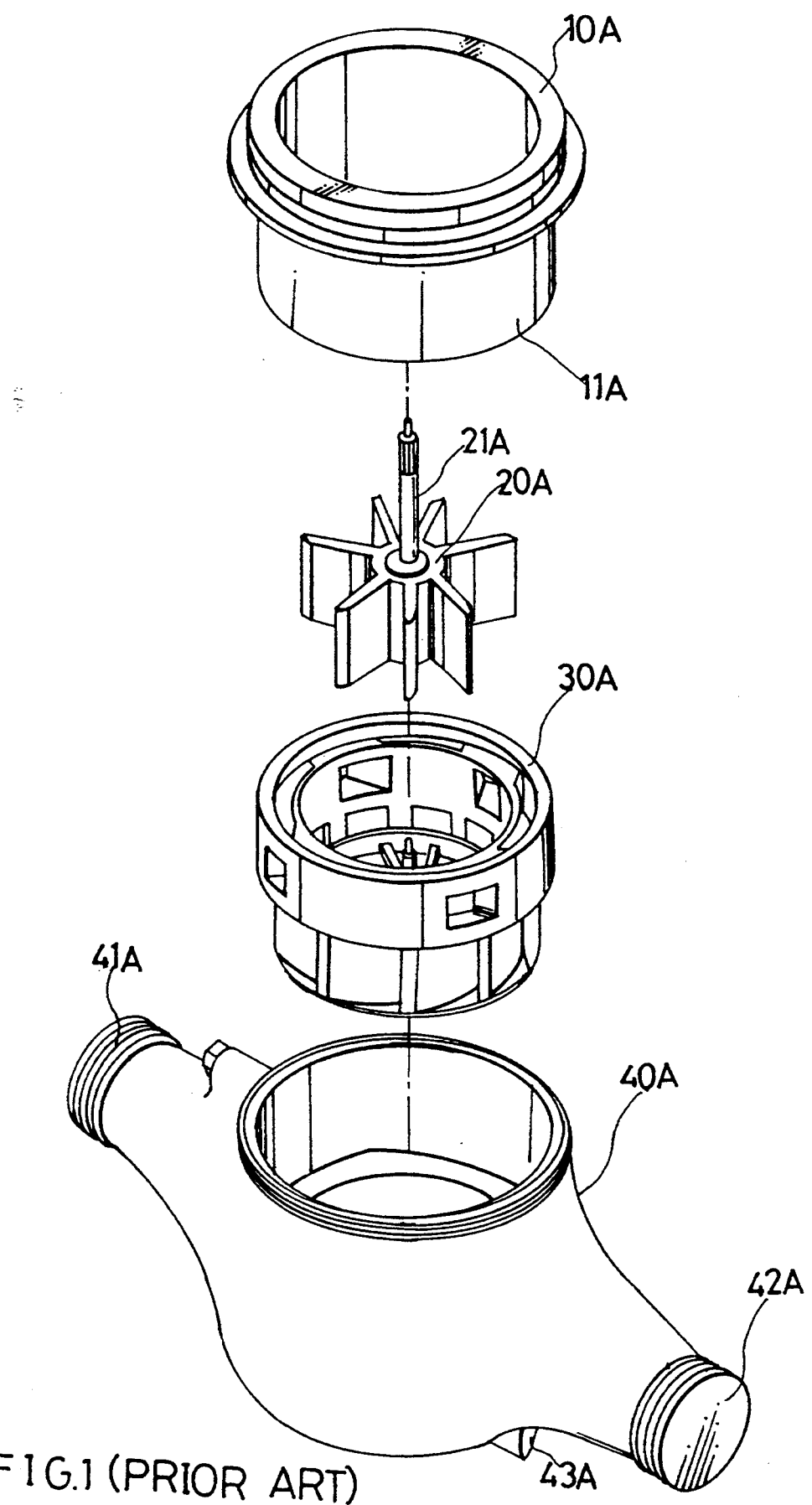
FIG. 1 is a diagaram showing the exploded components of the conventional water meter.
Figure 2:
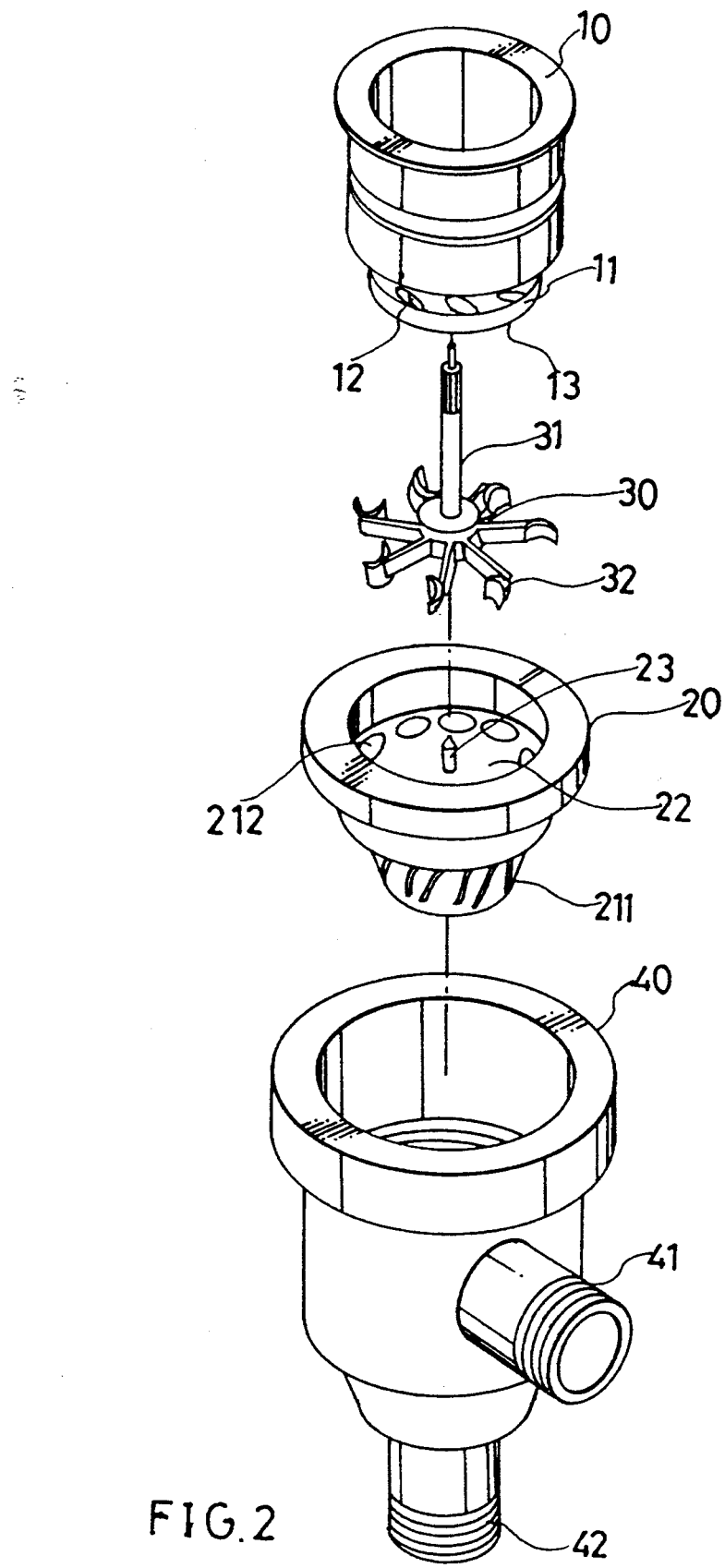
FIG. 2 is a perspective view of the exploded components of the present invention.

Referring to FIG. 2, the present invention has a meter body 10 having an extended bottom portion 11 on which are disposed a plurality of spaced first oval holes 12; and at the center of the meter body 10 is disposed a small round hole 13. To the bottom of the water meter 10 is mounted a cone-shaped block 20 having a central cavity 22 with a projected mounting post 23 disposed at the center thereof.

To the mounting post 23 is mounted a rotation propeller 30 having an extended driving shaft 31 inserted into the small round hole 13 at the center of bottom portion 11 of the water meter 10. The so assembled water meter is received in a housing cavity 40 to the bottom of which is attached a removable tube 50.

Figure 3:
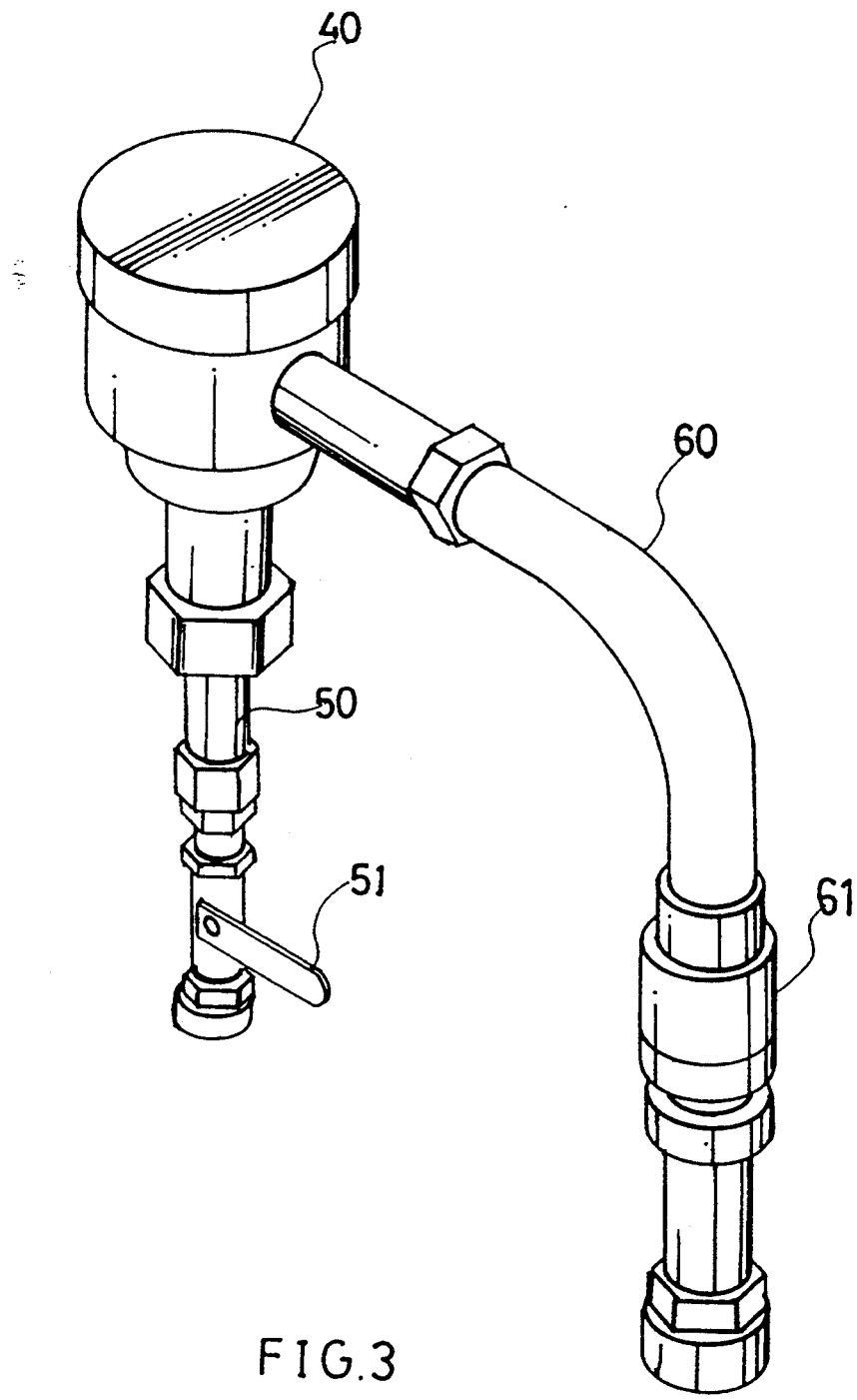
FIG. 3 is a diagram showing the meter mounted in connection with ducts.

As shown in FIG. 3, a water inlet ball valve 51 is further connected to the removable tube 50. Extended from the middle of the housing cavity 40 is an elbow tube 60 to which is further connected a check valve 61. The check valve 61 is used to prevent water from flowing back and making the water meter reversely actuated.

The rotation propeller 30 is provided with a plurality of spaced blades 32 which can be urged by water led into the cone-shaped block 20 via the slots 211 and further into the central cavity 22 of the block 20 via the multiple second oval holes 212 so as to make the propeller 30 to spin. In other words, water is led through the slots 211 disposed on the periphery of the bottom end of the cone-shaped block 20 and is discharged out of the second oval holes 212 which communicate with the slots 211. The water flowing into the central cavity 22 can finally urge the propeller 30 to rotate and causes the water meter to function and is discharged out of the meter body via the spaced first oval holes 12 at the bottom end of the meter body 10, keeping record of the amount of water flowing therethrough.

I claim:

1. An improved vertical water meter, comprising:
   a meter body having an extended bottom portion and a plurality of spaced first oval holes at one end thereof;
   a rotation propeller;
   a cone-shaped block having a central cavity;
   a housing cavity having a vertical water inlet duct and a horizontal water outlet duct;
   an elbow tube connected to said horizontal water outlet duct;
   a check valve being connected to said elbow tube;
   a removable tube being connected to said vertical water inlet duct;
   a ball valve being connected to said vertical water inlet duct;
   said rotation propeller having an extended driving shaft and a plurality of spaced blades;
   said cone-shaped block being provided with a mounting post at the center of said central cavity; and a plurality of spaced second oval holes on the periphery of said central cavity; a plurality of spaced slots disposed at the end of said cone-shaped block;
   a round hole being disposed at the center of said extended bottom portion and engaged with one end of said driving shaft;
   said rotation propeller being mounted to said mounting post at one end and engaged with said round hole at the other;
   said rotation propeller being housed between said meter body and said central cavity of said cone-shaped block;
   said cone-shaped block and said meter body being received in said housing cavity;
   whereby water led into said vertical inlet duct and further into said cone-shaped block via said slots and said second oval holes and discharged out thereof via said spaced first oval holes at one end of said meter body.

* * * * *